April 12, 1927.
A. L. MURRAY
1,624,500
COMPOSITE RUBBER SOLE
Filed May 28, 1925
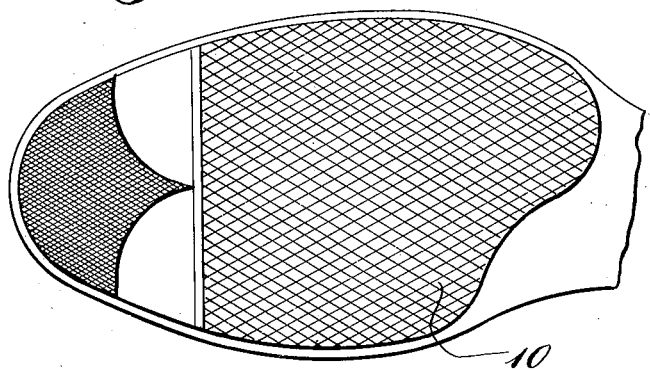
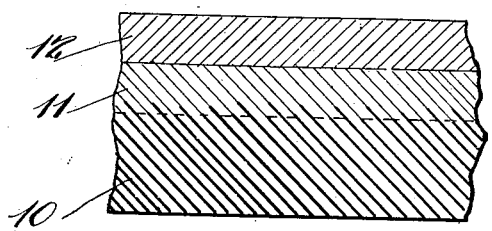
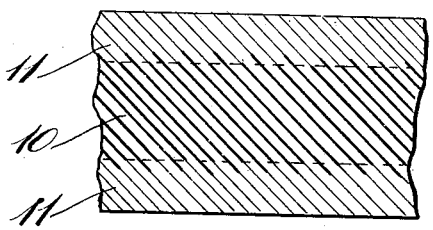
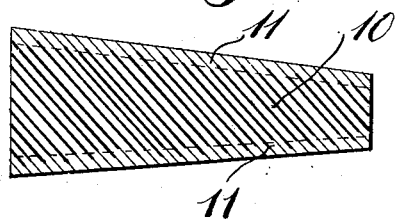
INVENTOR.
Albert L. Murray.
BY
Clarkson
ATTORNEY.

Patented Apr. 12, 1927.

1,624,500

UNITED STATES PATENT OFFICE.

ALBERT LINN MURRAY, OF AUBURN, INDIANA.

COMPOSITE RUBBER SOLE.

Application filed May 28, 1925. Serial No. 33,423.

This invention relates to improvements in composite rubber sheets and has special reference to a continuation in part of my prior Patent No. 1,577,349, granted March 16, 1926 for processes of securing rubber to leather and other like materials.

More particularly the invention relates to the article described in the above-mentioned patent and produced by the process therein described.

In order that the present application may be fully understood certain terms to be hereinafter used will now be defined.

By "raw rubber" or "unvulcanizable" is to be understood the coagulated latex of a rubber producing plant having neither a vulcanization admixture nor an admixture of any substance which, upon the raw rubber being placed in contact with a vulcanization element such as sulphur, will act to cause the vulcanization element to pass into or impregnate the raw rubber. To explain: Rubber may be mixed with zinc but even if subjected to heat will not vulcanize. If such rubber be exposed in any way to the forms of sulphur and subjected to heat it can absorb the sulphur and will be vulcanized upon proper physical conditions being produced. Raw rubber, as here meant, is understood to have neither an active vulcanizing agent such as sulphur nor to have a passive or catalyzing agent such as zinc mixed therewith. It is not, however, intended that the term, as used herein, is to mean chemically pure coagulated latex, but simply to describe a coagulated latex, which may be mixed with substances inert as far as vulcanization is concerned, but is free from any substance tending to assist in the vulcanizing process.

On the contrary by "vulcanizable rubber" as herein used is meant a rubber impregnated with such substances and in such quantities that the usual vulcanizing treatment will harden and toughen the rubber.

Raw rubber, as herein defined, is a substance which has a surface which is normally sticky or "tacky" and its surface, if protected so as to be unexposed to the air for a considerable time, remains in this sticky condition. Further, raw rubber is especially susceptible to the action of solvents, such as gasoline, ether, carbon tetrachloride and other such well known solvents. Vulcanized rubber is much less susceptible to such action. In applying a rubber cement to raw rubber the solvent of the cement quickly dissolves a film of rubber from the rubber and, upon the solvent evaporating, the rubber dissolved from the raw and softened surface and the rubber content of the cement so unite with the body of the raw rubber as to form a body uniform in structure. Consequently, two such raw rubber elements may be so united by rubber cement as to form a homogeneous mass and rubber sheet or mass having a raw rubber surface may be connected by a rubber cement to a leather or other surface in a highly efficient manner which will strongly resist any efforts at separation.

In the present invention the raw rubber sheet referred to must have a surface which will be immediately dissolved by the solvents of the rubber cement so that the cement residue after evaporation of the solvents will be homogeneous with the raw rubber, I find that I get this quickly dissolvable condition by using raw rubber which has been previously milled, rather than by using unmilled crepe rubber as it comes from the plantation. The reason for the superior results produced by the milled raw rubber is that unmilled crepe rubber has an air-dried and hardened surface which is not completely broken down simply by the heat and pressure of molding but which is perfectly broken down and destroyed by the masticating process known as milling. My second or extra sheet of raw rubber, because of extreme thinness in the first sheet of raw rubber, may be a sheet of milled raw rubber.

I will describe further that it is necessary not only to prevent the curing action from extending through the raw rubber and thus destroying the sticky and easily dissolvable surface, but it is also necessary to prevent the working through of what is called the "bloom" of the vulcanized rubber. This I prevent by using an accelerator of such a character that in connection with the other ingredients used in my tread compound I obtain what is known as a non-blooming stock.

The principal object of the present invention is to produce a novel composite rubber article, preferably of sheet form, which will have at least one surface of raw rubber, the body of the piece or sheet being of vulcanized rubber, the raw rubber being joined to the body by the process to which the body is subjected during its vulcanization.

I have found that, while the invention is not restricted thereto, it is well adapted to the production of rubber soles and heels for shoes. To exemplify the invention concretely a shoe sole of this construction will be particularly described but wherever reference is made to a shoe sole it is to be understood that a composite body or sheet of any shape whatever is to be understood as the equivalent thereof.

In such an article as a shoe sole the wear or tread portion is made of vulcanizable rubber and between the leather shoe sole and this tread will be provided with one or more layers of raw rubber. With such a construction the vulcanizing content of the tread will penetrate somewhat into the raw rubber and a true vulcanization will take place under proper heat or heat and pressure conditions. Again, if the raw rubber sheets be made thin enough the vulcanization process may even cause the spread of the vulcanizing content from the sole entirely through one or more plies so that such plies will also be united by vulcanization. Under all circumstances under my invention the vulcanizing process leaves the exposed surface of the outer ply or layer of raw rubber in a sticky or tacky condition so that one or more additional layers may be assembled thereon by any suitable means such as cement, heat or the like.

Therefore a further object of the invention is to provide a rubber sole of this character adapted to be applied to the leather sole of a new or old shoe without removing any of the layers of the original leather sole, thereby enabling the leather sole to insulate the rubber half-sole from the feet and prevent discomfort to the wearer, particularly preventing what is generally termed "drawing of the rubber" or "drawing of the feet."

Another object of the invention is to afford a neat, serviceable, satisfactory and economical method of half soling shoes and of enabling the half soles to be applied by either an experienced workman or an inexperienced person.

A further object of the invention is to provide a rubber half sole which will be pliant and elastic and adapted to elongate and adjust within itself, the strains put upon it by a person in the act of walking, thereby relieving the strains at the point of attachment or union of the rubber sole with the leather sole.

With the above and other objects in view the invention as described herein consists of a new article of manufacture as will now be specifically described and then particularly pointed out in the claims.

In the accompanying drawings a shoe sole has been illustrated as showing an example of the practical utility of my composite rubber sheet and like characters of reference are used throughout the several views wherein:

Figure 1 is a reverse plan view of a portion of a shoe provided with a rubber half sole constructed in accordance with this invention.

Figure 2 is an edge view of the rubber sole showing the layers before vulcanization.

Figure 3 is a similar view illustrating the layers of the rubber half sole after vulcanization.

Figure 4 is an enlarged detail section showing the assembly of three sheets under the conditions of my present invention.

Figure 5 shows an enlarged detail section through a double faced sheet showing my invention.

Figure 6 shows a heel lift constructed in accordance with my invention, the same being double faced.

The composite sheet is here illustrated as a completed half sole but, whether or not this sheet is intended to be made in a half sole, it is formed, as illustrated, from a body 10 which in the case of a rubber sole, comprises the lower or tread layer. This layer or ply 10 consists of rubber or a rubber compound containing vulcanizing agents of any desired character, such as sulphur or the like. As well known in the manufacture of vulcanized rubber it is also necessary that this layer, at least for purposes of economy in manufacture, contain also some such catalyzing agent as powdered zinc. On the upper side of the tread layer is laid at least one layer or ply of rubber, which is what I preferably here term "raw rubber", meaning to be raw rubber as previously defined. Now, these two layers may be either preformed as to contour as will be done when making a shoe sole, or the like, or may be made of sheets of indefinite extent. The two sheets thus arranged are then subjected to a vulcanizing process. This may be done by either placing the sheets in a suitable vulcanizing press, by running the sheets through vulcanizing rolls, or by simply ensuring contact throughout the two sheets and subjecting them to a vulcanizing heat. Any other method of vulcanization may be used in connection with this invention and it is not my intent to restrict the invention to any particular process of producing vulcanization, the main object being to assure contact throughout between the two layers, while the vulcanization of the body layer is taking place. It is to be noted that the raw rubber contains in itself neither a vulcanizing element nor a catalyzer. However, the proximal surface of the base layer or sheet and the proximal surface of the raw rubber layer, being brought into immediate contact, the vulcanizing content of the base layer will, to a certain extent, penetrate the raw rubber although it will not, except in the case of extremely thin raw rubber, extend through to the opposite side. Accordingly if two such sheets are passed through a vulcanizing process it is easy to so arrange the thickness of the raw rubber that the surface remote from or opposite to the base contact surface will not be vulcanized, but will be left in its natural raw rubber state. Nevertheless, the two contact surfaces will be vulcanized together and there will be no direct plane of separation such as exists between two surfaces connected by adhesion. As a matter of fact the two layers thus arranged and vulcanized will so merge into each other that after the vulcanization process is completed it is impossible to state where the dividing plane between the two exists.

Raw rubber is frequently described as latex and by properly arranging the thickness of this raw rubber or latex the migration of the vulcanizing content of the base sheet may be limited so as to leave one surface entirely of raw rubber.

It is obvious that extremely thin lines of raw rubber may be superimposed so that we may have a third layer 12, of raw rubber, placed on top of the layer 11 and these may even be vulcanized together, but I have found by experimental work, that it is not advisable in all cases to multiply the layers, rather than an attempt of vulcanization of more than two layers together on one side of the base, it is better in many instances to apply a third layer consisting of raw rubber to the layer 11 by the use of a rubber cement or heat which will unite the third layer in a practically homogeneous manner, and will still leave a raw rubber surface.

It is obvious that the same process may be carried out as shown in Figures 5 and 6 on both sides of a vulcanizable rubber base.

It is also obvious that the union of two raw sheets may be assisted by some of the usual heat processes and further I use, in order to protect the sticky or tacky surface from drying out under air conditions the ordinary means of applying thereto an air tight fabric or coating such as hollands or the like. It is to be understood that this application of hollands to raw rubber surfaces is not claimed by me as part of my invention since it is common to apply the same for the protection of raw rubber surfaces, but I desire that it be made clear that such application of an air tight covering or coating enables devices made under my invention to be maintained for exceedingly long times with the raw rubber surface remaining fresh.

With a shoe sole or other sheet prepared in this manner a rubber cement will unite the same firmly to a second raw rubber surface or to leather and thus, particularly in the case of a shoe sole, nails, sewing and the like may be eliminated since the cement itself will so hold the sole on the shoe that only by the tearing either of some part of the leather or some part of the rubber, can the two be separated.

Having thus described the invention, what is claimed as new, is:

1. A rubber sole for boots and shoes consisting of a rubber tread having a backing formed of raw milled rubber inseparably secured to the tread, the exposed face of the backing being adapted to be readily attached by the solvents in rubber cement for securing the sole to the leather sole of the boot or shoe.

2. A composite rubber sole comprising a layer of milled raw rubber, and a layer of completely vulcanized rubber inseparably secured thereto.

3. A composite rubber sole, comprising a layer of completely vulcanized rubber, a layer of milled raw rubber inseparably secured thereto, on one face thereof, and a second layer of milled raw rubber inseparably secured to the outer face of the first named layer of raw rubber.

In testimony whereof I affix my signature.

ALBERT LINN MURRAY.